(12) United States Patent
Eberlein et al.

(10) Patent No.: US 7,841,250 B2
(45) Date of Patent: Nov. 30, 2010

(54) DRIVE DEVICE

(75) Inventors: Werner Eberlein, Erlangen (DE); Klaus Recker, Neumarkt (DE)

(73) Assignee: Siemens Aktiengesellschaft, München (DE)

( * ) Notice: Subject to any disclaimer, the term of this patent is extended or adjusted under 35 U.S.C. 154(b) by 558 days.

(21) Appl. No.: 11/570,373

(22) PCT Filed: Jun. 7, 2005

(86) PCT No.: PCT/EP2005/052622

§ 371 (c)(1),
(2), (4) Date: Nov. 27, 2007

(87) PCT Pub. No.: WO2005/122366

PCT Pub. Date: Dec. 22, 2005

(65) Prior Publication Data

US 2008/0127757 A1  Jun. 5, 2008

(30) Foreign Application Priority Data

Jun. 11, 2004  (DE) ........................ 10 2004 028 355

(51) Int. Cl.
*F16H 27/02* (2006.01)
(52) U.S. Cl. .................................... 74/89.23
(58) Field of Classification Search ........... 74/89,
74/89.23, 89.29, 89.31, 89.43, 89.44, 424.6,
74/424.7, 424.71, 424.81, 424.82, 424.85,
74/425.5; 384/43; 310/80, 112, 113, 114
See application file for complete search history.

(56) References Cited

U.S. PATENT DOCUMENTS 1,918,108 A * 7/1933 Jonkhoff ..................... 464/168
4,634,296 A * 1/1987 Watanabe .................... 384/45
6,051,896 A   4/2000 Shibuya et al.

(Continued)

FOREIGN PATENT DOCUMENTS

DE    OS 43 44 335    6/1995

(Continued)

*Primary Examiner*—Vicky A Johnson
(74) *Attorney, Agent, or Firm*—Henry M. Feiereisen; Ursula B. Day

(57) ABSTRACT

The invention relates to a drive device (9) comprising a housing (10), a drive shaft (14) which is mounted in the housing (10) and which comprises a shaft axis (15) and a first and a second electric drive (12,13). The drive shaft (14) can be rotated about the shaft axis (15) by means of a drive (12,13) and can be displaced in an axial manner along the shaft axis (15). The drives (12, 13) are aligned on the shaft axis (15) and comprise, respectively, a stator (16,19) and a rotor (17,20). The stators (16,19) are secured to the housing (10). The rotors (17,20) are embodied as hollow shafts and are mounted on the housing (10). The rotor (20) of the second drive (13) is rotationally secured to the drive shaft (14) by means of a linear bearing device (28), and in a manner which enables it to be axially displaced. The rotor (17) of the first drive (12) is rotationally secured to a threaded spindle (27) and is connected in such a manner that it cannot be axially displaced. Said drive shaft (14) is rotationally connected to a threaded nut (29) which co-operates with the threaded spindle (27) and in such a manner that it cannot be axially displaced. The drive shaft (14) comprises a recess (31) which is used to receive the threaded spindle (27).

24 Claims, 3 Drawing Sheets

U.S. PATENT DOCUMENTS

| | | | |
|---|---|---|---|
| 6,087,734 A * | 7/2000 | Maeda et al. | 290/40 C |
| 6,247,913 B1 * | 6/2001 | Shibuya et al. | 425/145 |
| 6,362,547 B1 * | 3/2002 | Peterson et al. | 310/80 |
| 6,453,761 B1 * | 9/2002 | Babinski | 74/89.34 |
| 6,531,798 B1 * | 3/2003 | Palmero | 310/112 |
| 2002/0047367 A1 | 4/2002 | Kim et al. | |
| 2004/0222706 A1 * | 11/2004 | Ickinger | 310/12 |

FOREIGN PATENT DOCUMENTS

| | | |
|---|---|---|
| DE | PS 43 44 335 | 2/1996 |
| DE | 102 22 748 | 5/2003 |
| DE | 102 13 679 | 10/2003 |
| EP | 0 723 848 | 7/1996 |
| JP | 61 266822 A | 11/1986 |
| JP | 62004922 A * | 1/1987 |
| JP | 9 201005 A | 7/1997 |
| WO | WO 99/44274 | 9/1999 |

* cited by examiner

DRIVE DEVICE

BACKGROUND OF THE INVENTION

The present invention relates to a drive device comprising a housing, a drive shaft which is supported in the housing and which comprises a shaft axis and a first and second electric drive,
- the drive shaft being rotatable about the shaft axis by means of the electric drives and being axially displaceable along the shaft axis,
- the two drives being aligned on the shaft axis and each comprising a stator and a rotor,
- the stators being fixed to the housing,
- the rotors being embodied as hollow shafts and being supported on the housing,
- the rotor of the second drive being rotationally locked to the drive shaft by means of a linear bearing device, but being axially displaceable.

Such a drive device is disclosed, for example, by DE 43 44 335 C2. It is used where a drive shaft is intended to be both rotatable about its shaft axis and displaceable in the direction of its shaft axis. An example of such a use is the movement of a feed screw of an injection molding machine. Examples of other uses are conveyor arms, which serve to convey a workpiece from a first machining station to a second machining station or the like. In the case of these conveyor arms a workpiece is often first raised, then swiveled in an arc and then lowered again. Such movements also occur in the winding of yarns and coiling of wires. Finally such movements are also particularly feasible in drives for lathe spindles.

In the known drive device the second drive is indirectly connected to the drive shaft by way of a threaded spindle, which is in turn rotationally locked to the drive shaft and axially fixed. Arranged on the rotor of the second drive is a drive journal, which engages in a recess in the threaded spindle and is supported in the latter so that it is rotationally fixed but axially displaceable. The rotor of the first drive is rotationally locked to a threaded nut interacting with the threaded spindle and is axially fixed.

The known drive device is complicated to manufacture from a production engineering standpoint, in particular because the recess for the drive journal of the second rotor has to be let into the threaded spindle. Furthermore, the design construction dictates that the two drives be arranged axially in series, giving the drive device a large overall axial construction. Finally the lever arm with which the drive journal of the second drive acts on the drive shaft is relatively small, so that only relatively low torques can be transmitted, resulting in only a relatively low torsional rigidity.

SUMMARY OF THE INVENTION

The object of the present invention is to further develop a drive device of the aforementioned type so that it is easier to manufacture from a production engineering standpoint and so that a high torsional rigidity can be achieved.

The object is achieved in that
- the rotor of the first drive is rotationally locked to a threaded spindle and is axially fixed,
- the drive shaft is rotationally locked to a threaded nut interacting with the threaded spindle and is axially fixed and
- the drive shaft has a recess to accommodate the threaded spindle.

This firstly means that a recess no longer has to be made in the threaded spindle, so that a standard threaded spindle can now be used. Secondly the drive shaft can now be connected directly to the rotor of the second drive, which makes it possible to transmit relatively high torques and leads to a high torsional rigidity.

If the drives are nested radially one inside the other, it is moreover possible to achieve a small overall axial length of the drive device. In this case the first drive is preferably the radially inner drive. This serves to simplify the design construction of the drive device yet further.

In view of the nested arrangement of the drives one radially inside the other, the radially inner drive is preferably embodied as an inner rotor motor. For the same reason the radially outer drive is preferably embodied as an outer rotor motor.

In an inner rotor motor the stator is situated radially further outwards than the rotor. In an outer rotor motor the reverse is true. Both stators therefore lie radially inside the two rotors. The construction of the drive device can therefore be simplified yet further in that the housing has an annular element, which extends in an axial direction between the rotors of the drives and the stators of both drives. In addition, this measure can also serve to reduce the overall radial space required.

The annular element is preferably embodied as a cooling device for the stators. This makes it possible to achieve a high drive power output. This applies, in particular, if the annular element has an annular duct for a cooling medium, particularly water.

Both axial and radial forces act on the rotor of the first drive. It is therefore preferably supported both radially and axially on the housing, in particular by way of a radial bearing and an axial bearing separate therefrom. On the other hand, only radial forces act on the rotor of the second drive. With regard to the rotor of the second drive, therefore, it is sufficient if this is only supported radially on the housing.

An even more compact construction results if the first and/or the second drive is embodied as a permanently energized three-phase synchronous motor. In principle, however, other drives such as three-phase asynchronous motors or direct current motors may also be used.

If the first and/or the second drive has permanent magnets, which are arranged in the rotor of the permanently energized motor, no current supply of any kind to moving parts is required, whether by way of slip rings or by way of transformer arrangements.

If position sensors, which can be connected to a position controller associated with the respective drive, are assigned to the first and/or the second drive, it is easy to control the rotational and/or the axial position of the drive shaft. The position of the rotor of the second drive in this case corresponds to the rotational position of the drive shaft, and the difference between the position of the first drive and the position of the second drive corresponds to the axial displacement of the drive shaft. The positional difference is then translated directly into the axial displacement using the pitch of the threaded spindle.

The linear bearing device preferably has at least three linear bearings uniformly spaced in a circumferential direction. This affords the drive shaft an especially reliable radial support in relation to the rotor of the second drive. The linear bearings here preferably have carriages and linear guides.

Axial displacement of the drive shaft is particularly easy and reliable if roller bearings are arranged between the carriages and the linear guides. The design construction of the roller bearings can at the same time be kept simple, if they are embodied as roller bearing chains rotating around the linear guides.

The roller bearings of the linear guides function particularly reliably if the linear guides taper continuously in a circumferential direction, and are in particular rounded or angled, at their axially separated ends.

The carriages are preferably arranged on the rotor of the second drive, and the linear guides on the drive shaft. In principle it would also be possible, however, to arrange the carriages on the drive shaft and the linear guides on the rotor of the second drive.

A rotation of the rotor of the first drive relative to the rotor of the second drive can be translated especially smoothly into an axial displacement of the drive shaft if a ball bearing is arranged between the threaded spindle and the threaded nut.

As already mentioned in the introductory part, the drive device may be used wherever both a rotational movement of the drive shaft and a drive shaft axial feed movement are to be accomplished. An especially preferred application, however, is as a drive device for a feed screw of an injection molding machine.

BRIEF DESCRIPTION OF THE DRAWING

Further advantages and details are set forth in the following description of an exemplary embodiment in conjunction with the drawings. In the schematic drawings.

DETAILED DESCRIPTION OF PREFERRED EMBODIMENTS

Figure 1:
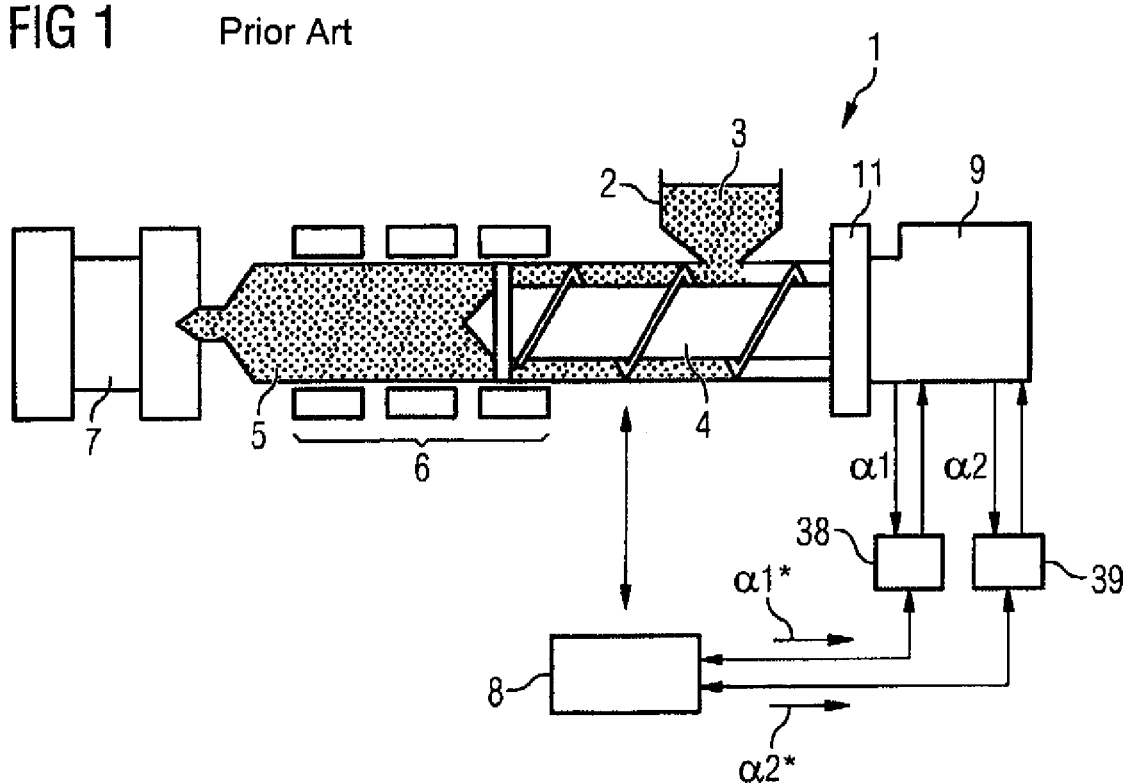
FIG. 1 shows a block diagram of an injection molding machine.

According to FIG. 1 an injection molding machine, generally denoted by the reference numeral 1, has among other things a filling hopper 2, via which plastic granulate 3 is fed to the injection molding machine 1. The plastic granulate 3 is conveyed by the rotation of a feed screw 4 into a plasticating chamber 5 of the injection molding machine 1. There it is melted through heating by means of a schematically indicated heating 6. It is then injected through axial displacement of the feed screw 4 into an injection mold 7, where it solidifies to the finished injection molded part.

Figure 2:
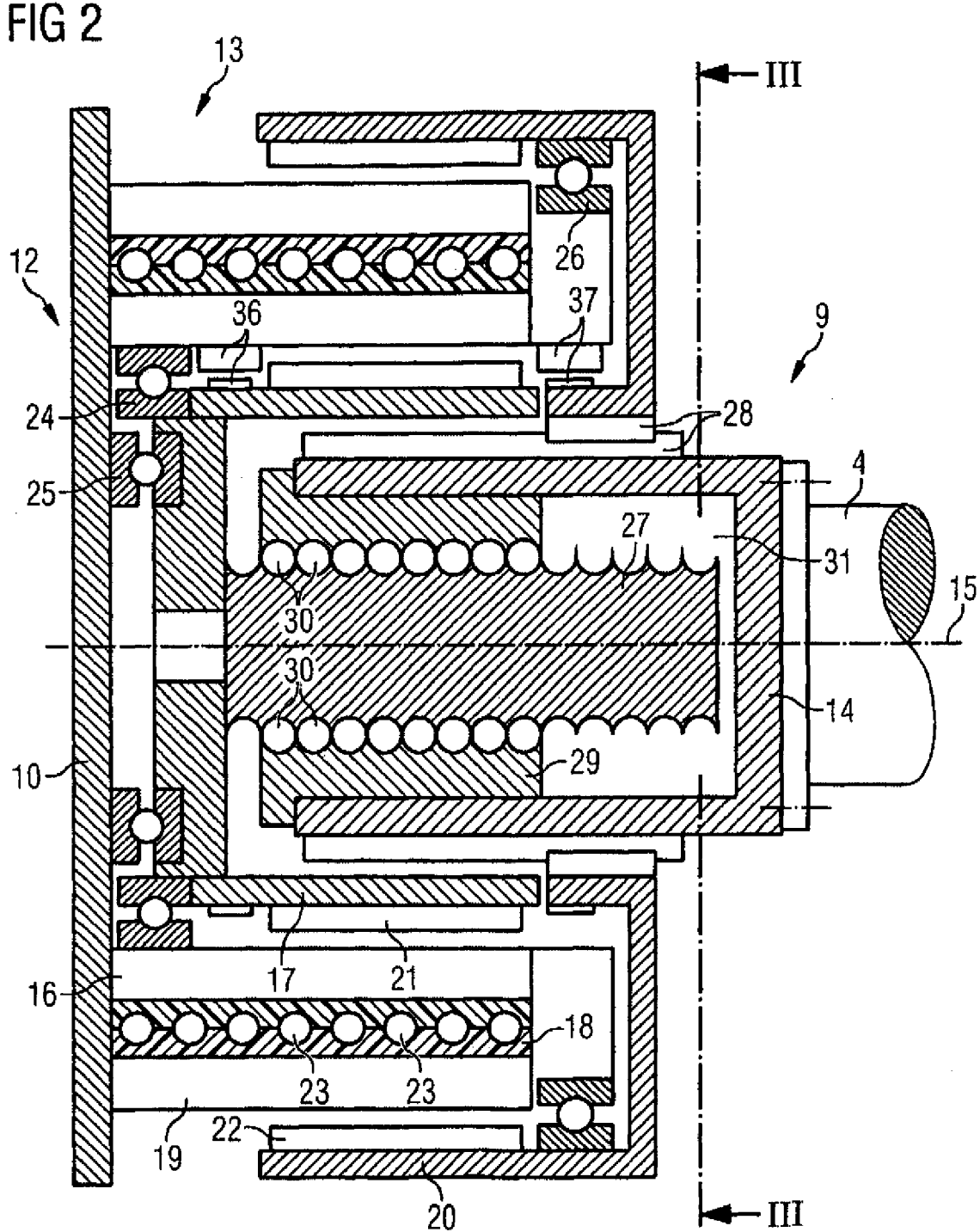
FIG. 2 shows a section through a drive device according to the invention.

The functioning of the injection molding machine 1 is controlled by a control device 8. Among other things the control device 8 controls a drive device 9, which produces both the rotation of the feed screw 4 and the axial displacement of the feed screw 4. This drive device 9 forms the subject of the present invention. It will be explained in more detail below in conjunction with FIGS. 2 to 4, in particular FIG. 2. For regularity's sake it should be mentioned that the representation of the drive device 9 in FIG. 2 is laterally inverted compared to the arrangement in FIG. 1. Left and right are therefore reversed in FIGS. 1 and 2.

According to FIG. 2 the drive device 9 has a housing 10. The drive device 9 is connected, for example bolted, to a body 11 of the injection molding machine 1 by way of the housing 10. A first electric drive 12 and a second electric drive 13 are arranged in the housing 10. The drives 12, 13 act on a drive shaft 14 having a shaft axis 15, which is supported in the housing 10. The drives 12, 13 are aligned with the shaft axis 15.

According to FIG. 2 the drives 12, 13 are radially nested one inside the other. In this case the radially inner drive is the first drive 12.

The first drive 12 is embodied as an inner rotor motor. It therefore has a stator 16 and a rotor 17, the rotor 17 being arranged radially inside the stator 16. The stator 16 of the first drive 12, that is to say the radially inner driver 12, is here arranged on an annular element 18, which is an integral part of the housing 10 and extends in an axial direction to above the rotor 17 of the first drive 12.

The second drive 13 is embodied as an outer rotor motor. It therefore likewise has a stator 19 and a rotor 20, the rotor 20, however, being arranged radially outside the stator 19. The stator 19 of the second drive 13, that is to say the radially outer drive 13, is in this case likewise arranged on an annular element 18. The annular element 18 is therefore an element common to both drives 12, 13, which extends in an axial direction between the rotors 17, 20 of the drives 12, 13 and carries the stators 16, 19 of both drives 12, 13. Both stators 16, 19 are therefore in fact fixed to the housing 10 indirectly by way of the annular element 18.

The drives 12, 13 are preferably embodied as permanently energized three-phase synchronous motors 12, 13, since this results in an especially compact construction of the drive device 9. They therefore have permanent magnets 21, 22. According to FIG. 2 the permanent magnets 21, 22 are here arranged in the rotors 17, 20 of the drives 12, 13.

According to FIG. 2 the annular element 18 has a cooling duct 23 for a cooling medium. The cooling medium here is preferably water. The annular element 18 is therefore embodied as a cooling device for the stators 16, 19.

As can further be seen from FIG. 2, the rotors 17, 20 are embodied as hollow shafts and are supported on the housing 10. The rotor 17 of the first drive 12 is here supported radially by way of a radial bearing 24 on the housing 10. As represented in FIG. 2, the radial bearing 24 may be embodied, in particular, as a roller bearing, such as a ball bearing. The axial support for the rotor 17 of the first drive 12 is preferably accomplished by way of an axial bearing 25 separate from the radial bearing 24. The axial bearing 25 is also preferably embodied as a roller bearing, such as a ball bearing again, as represented in FIG. 2. The rotor 20 of the second drive 13 is preferably supported only radially on the housing 10, again preferably by way of a roller bearing 26, such as a ball bearing.

According to FIG. 2 the rotor 17 of the first drive 12 is rotationally locked to a threaded spindle 27 and is axially fixed. The rotor 20 of the second drive 13 on the other hand is rotationally locked to the drive shaft 14 by way of a linear bearing device 28, but is axially displaceable. The drive shaft 14 is in turn rotationally locked to a threaded nut 29 and is axially fixed. The threaded nut 29 here interacts with the threaded spindle 27, for example by way of a ball bearing 30 arranged between the threaded spindle 27 and the threaded nut 29. The drive shaft 14 furthermore has a recess 31 to accommodate the threaded spindle 27.

If, in the drive device 9 in FIG. 2, the rotors 17, 20 of both drives 12, 13 are turned in the same direction at the same speed, a purely rotational movement of the drive shaft 14 occurs about its shaft axis 15. The rotational position of the shaft axis 14 here corresponds to the rotational position of the rotor 20 of the second drive 13. If only the rotor 17 of the first drive 12 is turned, a purely translational movement of the drive shaft 14 occurs along the shaft axis 15. The axial displacement of the drive shaft 14 along the shaft axis 15 here corresponds to the difference in the rotational positions of the rotors 17, 20. If the rotors 17, 20 of both drives 12, 13 are turned simultaneously, the rotational position of the drive shaft 14 corresponds to the rotational movement of the rotor 20 of the second drive 13. The axial movement of the drive shaft 14 corresponds via the pitch of the threaded spindle 27 to the difference in the rotational movements of the rotors 17, 20 of the two drives 12, 13.

Figure 3:
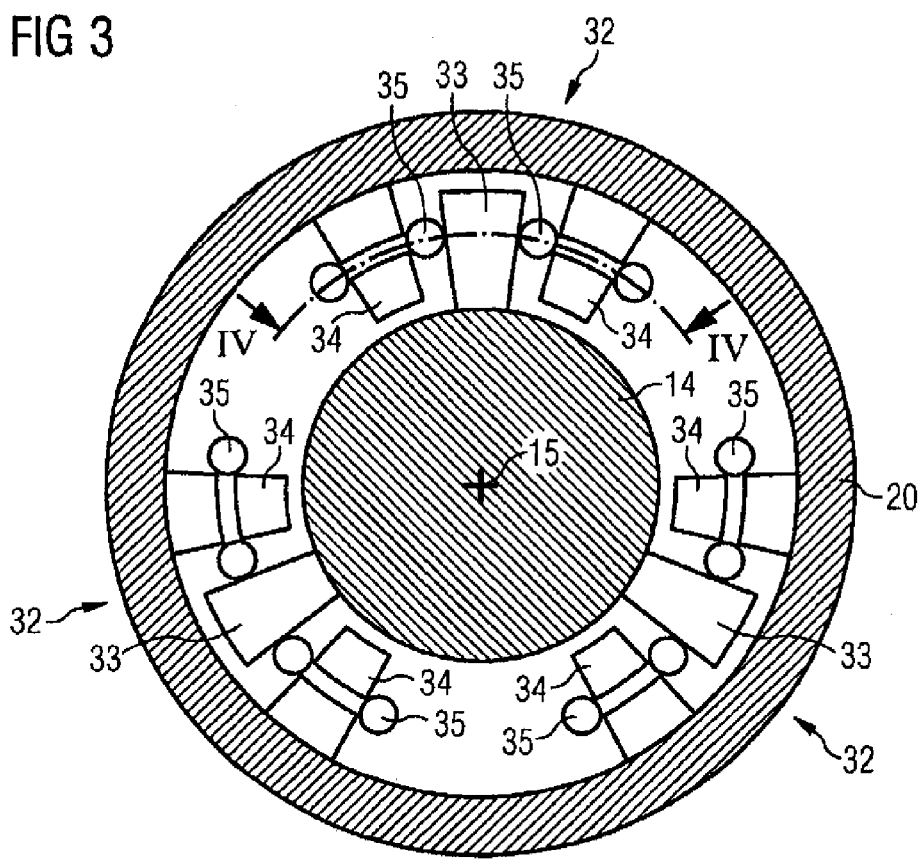
FIG. 3 shows a plan view of the drive device in FIG. 2.
Figure 4:
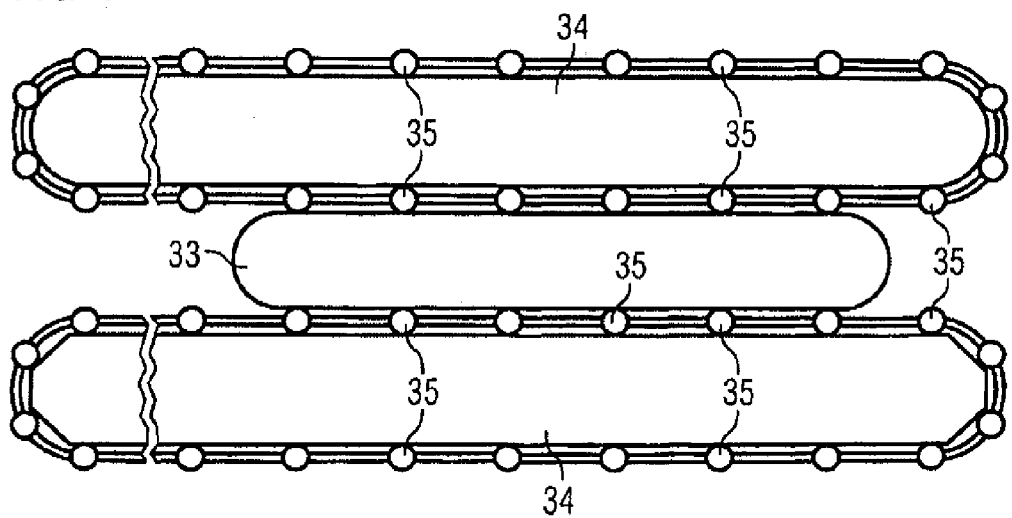
FIG. 4 shows a detail from FIG. 3.

In order that the linear bearing device 28 might also provide a facility for radial guiding of the drive shaft 14, the linear bearing device 28 preferably also has at least three linear bearings 32, which—see FIG. 3—are uniformly spaced in a circumferential direction around the shaft axis 15. The linear bearings 32 here comprise carriages 33 and linear guides 34. According to FIG. 3 the carriages 33 are arranged on the rotor 20 of the second drive 13, the linear guide 34 on the drive 14. In principle, however, an inverse arrangement would also be possible.

In order to achieve the smoothest possible and hence precise displacement of the drive shaft 14 in an axial direction, roller bearings 35 are preferably arranged between the carriages 33 and the linear guides 34. The roller bearings 35 may again be embodied as ball bearings. Irrespective of whether they are embodied as ball bearings or other roller bearings, the roller bearings 35 according to FIG. 4, however, are preferably embodied as roller bearing chains rotating around the linear guides 34. In order to permit the smoothest and most reliable operation, the linear guides 34 preferably taper continuously in a circumferential direction at their axially separated ends. As shown in the upper part of FIG. 4, the linear guides 34 may be rounded, for example. Alternatively it is also possible for the linear guides 34 to be angled. This is shown in the lower part of FIG. 4.

In most applications of the drive device 9 according to the invention both the rotational movement of the drive shaft 14 and its axial feed movement must be very precise. However, the axial feed at least must generally be very exact. Position sensors 36, 37, which can be connected to a position controller 38, 39 assigned to the respective drive 12, 13, are therefore preferably assigned to the first and the second drive 12, 13. By having the control device 8 send corresponding set point values $\alpha 1^*$, $\alpha 2^*$ to the position controllers 38, 39 and registering the corresponding actual values $\alpha 1$, $\alpha 2$ by means of the position sensors 36, 37 the position controllers 38, 39 are therefore capable of precisely controlling the rotational position of the drive shaft 14 and its axial displacement.

The drive device 9 according to the invention therefore combines a simple construction that is easy to produce with great compactness and reliability.

What is claimed is:

1. A drive device, comprising:
   a housing;
   a drive shaft supported in the housing and defining a shaft axis;
   first and second electric drives for rotating the drive shaft about the shaft axis and moving the drive shaft axially along the shaft axis, wherein the first and second electric drives are disposed in aligned relationship to the shaft axis and include each a stator fixed to the housing and a rotor constructed as hollow shaft and supported on the housing;
   a linear bearing device for supporting the rotor of one of the first and second electric drives in fixed rotative engagement to the drive shaft while allowing a movement of the rotor axially in relation to the drive shaft,
   a threaded spindle fixedly connected to the rotor of the other one of the first and second electric drives so that the rotor of the other one of the first and second electric drives is in fixed rotative and axially immovable engagement with the threaded spindle; and
   a threaded nut fixedly connected to the drive shaft so that the drive shaft is in fixed rotative and axially immovable engagement with the threaded nut,
   wherein the drive shaft has a recess to accommodate the threaded spindle,
   wherein the housing has an annular element which extends in an axial direction between the rotors of the first and second electric drives and supports the stators of the first and second electric drives.

2. The drive device of claim 1, wherein the first and second electric drives are nested radially one inside the other to define a radially inner drive and a radially outer drive.

3. The drive device of claim 2, wherein the inner drive is the other one of the first and second electric drives.

4. The drive device of claim 2, wherein the inner drive is constructed as an inner rotor motor.

5. The drive device of claim 2, wherein the outer drive is constructed as an outer rotor motor.

6. The drive device of claim 1, wherein the annular element is constructed as a cooling device for the stators of the first and second electric drives.

7. The drive device of claim 6, wherein the annular element has a cooling duct for flow of a cooling medium.

8. The drive device of claim 7, wherein the cooling medium is water.

9. The drive device of claim 1, further comprising a bearing assembly for supporting the rotor of the other one of the first and second electric drives radially and axially on the housing.

10. The drive device of claim 9, wherein the bearing assembly includes a radial bearing and an axial bearing which is separate from the radial bearing.

11. The drive device of claim 1, wherein the rotor of the one of the first and second electric drives is supported only radially on the housing.

12. The drive device of claim 1, wherein at least one of the first and second electric drives is constructed as a permanently energized three-phase synchronous motor.

13. The drive device of claim 12, wherein the at least one of the first and second electric drives has permanent magnets arranged in the rotor of the permanently energized three-phase synchronous motor.

14. The drive device of claim 1, wherein at least one of the first and second electric drives is operatively connected to a position sensor which is connectable to a position controller associated with the at least one of the first and second electric drives.

15. The drive device of claim 1, wherein the linear bearing device has at least three linear bearings uniformly spaced in a circumferential direction about the shaft axis.

16. The drive device of claim 15, wherein the linear bearings include carriages arranged on one member selected from the group consisting of rotor of the one of the first and second electric drives and drive shaft, and linear guides arranged on the other member selected from the group consisting of rotor of the one of the first and second electric drives and drive shaft.

17. The drive device of claim 16, further comprising roller bearings arranged between the carriages and the linear guides.

18. The drive device of claim 17, wherein the roller bearings are constructed as roller bearing chains rotating around the linear guides.

19. The drive device of claim 16, wherein the linear guides taper continuously in a circumferential direction at their axially spaced-apart ends.

20. The drive device of claim 16, wherein the linear guides are rounded at their axially spaced-apart ends.

21. The drive device of claim 16, wherein the linear guides are angled at their axially spaced-apart ends.

22. The drive device of claim 16, wherein the carriages are arranged on the drive shaft, and the linear guides are arranged on the rotor of the one of the first and second electric drives.

23. The drive device of claim 1, further comprising a ball bearing arranged between the threaded spindle and the threaded nut.

24. The drive device of claim 1, constructed as drive device for a feed screw of an injection molding machine.

* * * * *